(No Model.) 2 Sheets—Sheet 1.

A. L. RICH.
POWER TRANSMITTER.

No. 584,521. Patented June 15, 1897.

Witnesses:
Thomas M. Dickie.
Curtis S. Marshall.

Inventor:
Abraham L. Rich.

(No Model.) 2 Sheets—Sheet 2.

A. L. RICH.
POWER TRANSMITTER.

No. 584,521. Patented June 15, 1897.

Witnesses:
Thomas M. Dickie.
Curtis S. Marshall.

Inventor:
Abraham L. Rich.

UNITED STATES PATENT OFFICE.

ABRAHAM L. RICH, OF PITTSBURG, PENNSYLVANIA.

POWER-TRANSMITTER.

SPECIFICATION forming part of Letters Patent No. 584,521, dated June 15, 1897.

Application filed March 26, 1894. Serial No. 505,182. (No model.)

*To all whom it may concern:*

Be it known that I, ABRAHAM L. RICH, a citizen of the United States, residing at Pittsburg, in the county of Allegheny and State of Pennsylvania, have invented a new and useful Power-Transmitter, of which the following is a specification, accompanied by drawings, in which—

Figure 1:
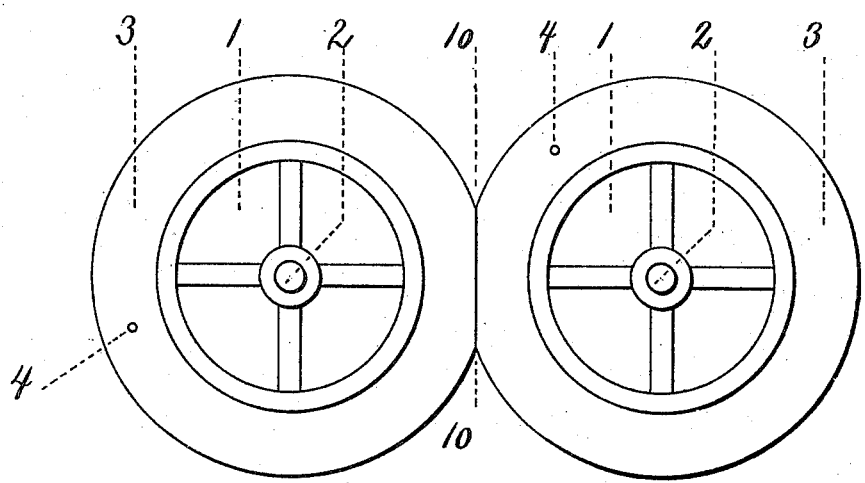
Figure 2:
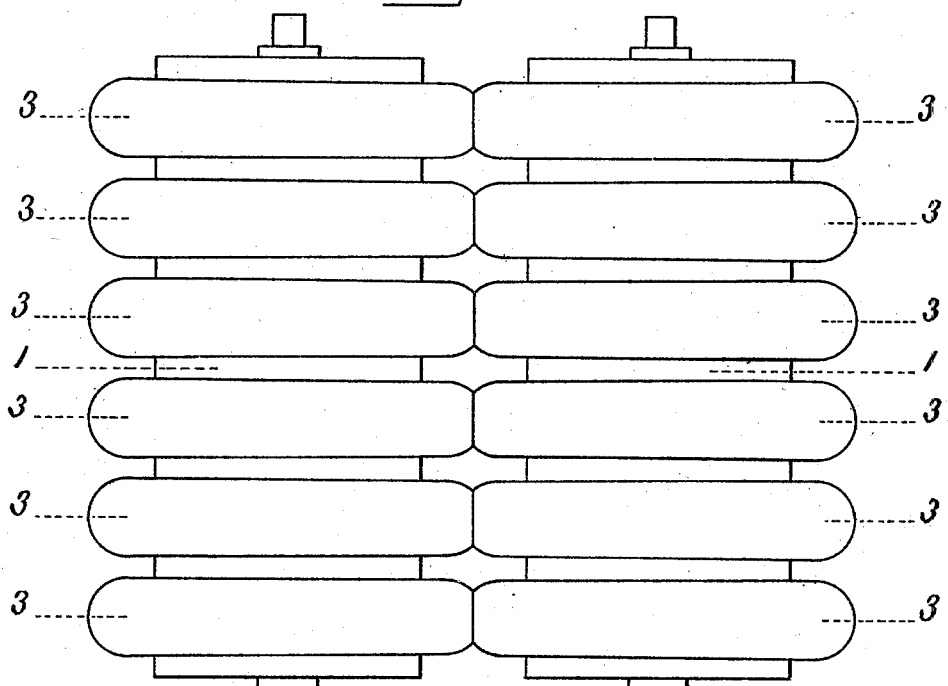
Figure 3:
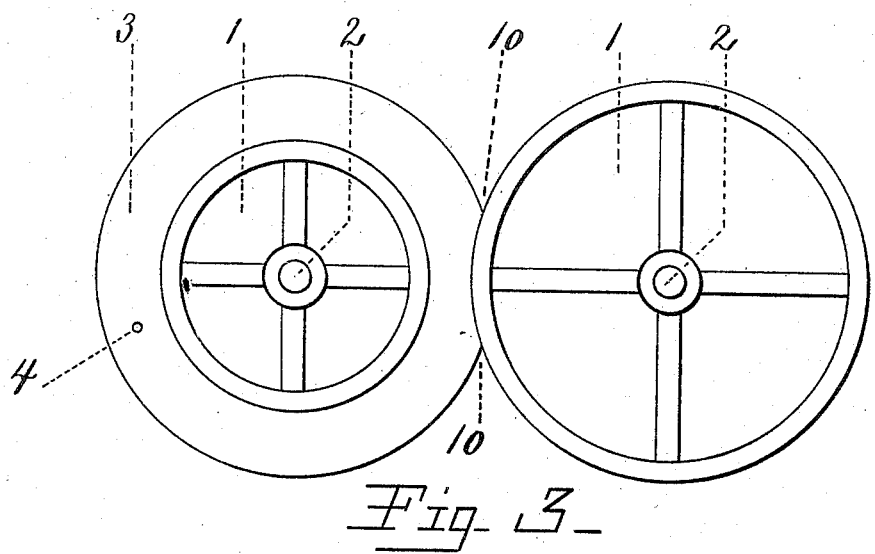
Figure 4:
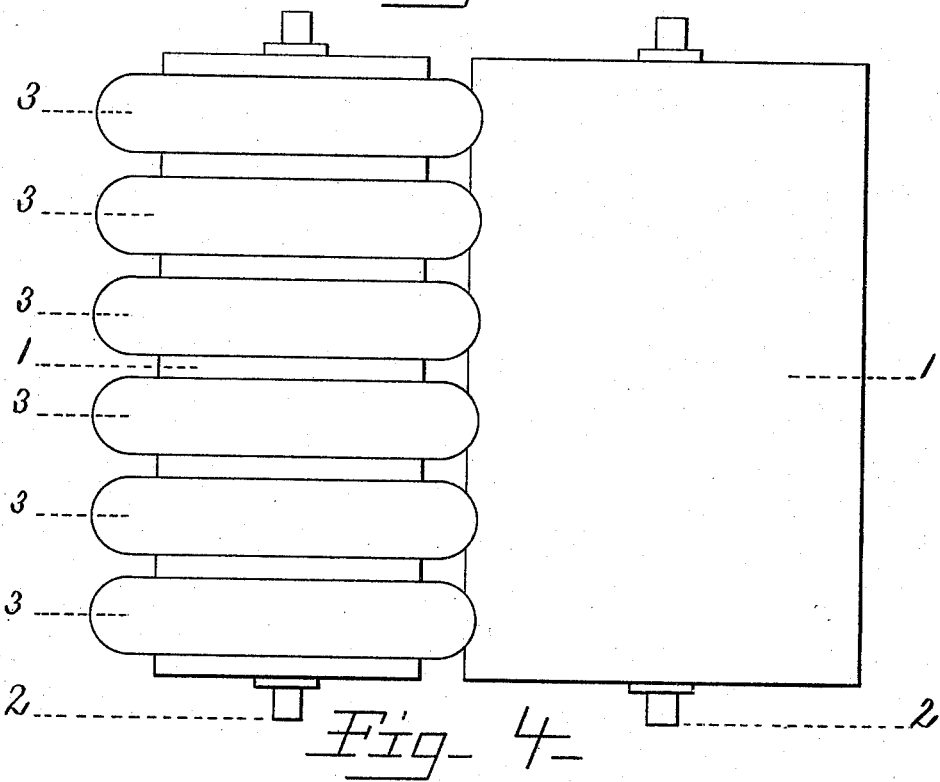

Figure 1 is a side view of pulleys embodying my invention in engagement to transmit power frictionally. Fig. 2 is a top view of Fig. 1. Fig. 3 is also a side view of pulleys frictionally engaged and embodying my invention. Fig. 4 is a top view of Fig. 3.

My invention relates to transmissions of power effected by pulleys frictionally geared, pulleys and belts, toothed gearing, and metallic-link-belt and sprocket-wheel gearing.

In power transmissions effected by pulleys of the usual kind frictionally geared insufficient area of contact, imperfect adhesion, irregularity of motion, variable effort, vibration, &c., result in slipping and wearing and loss of power.

In power transmissions effected by belts of the usual kind passing over the usual kind of pulley variable tension, stretching, induction of air between belt and pulley, imperfect adhesion, irregularity of motion, &c., result in slipping and loss of power.

Transmissions of power, as above stated, generally require high rotative speed and continuous motion. Where slow rotative speed, frequent stopping and starting, and positive motion are incidents of the work to be performed, recourse is generally had to toothed gearing.

Toothed gearing and metallic-link-belt and sprocket-wheel gearing have manifest defects.

Referring to the drawings, 1 represents a pulley supported on a shaft 2 and having a fluid-tight flexible envelop or tube 3, containing fluid, preferably air, and forming the periphery of said pulley. The fluid-tight flexible envelop or tube 3 of the pulley 1 is provided with a retention-valve 4, preferably a check-valve, through which fluid can be injected into said fluid-tight flexible envelop or tube. The pulleys, as shown in the illustrations, Figs. 1, 2, 3, and 4, can be placed or adjusted so that the point or line of contact 10 is greatly elongated, and consequently greatly increasing the area of contact and the adhesion. The fluid in the pulley can be maintained at any desirable pressure—say a few ounces or ten, thirty, one hundred, or more pounds to the square inch.

In Figs. 3 and 4 there is shown a plural number of pulleys, one embodying my invention and one being the usual kind of pulley, in engagement to transmit power frictionally. The pulleys, as shown in said Figs. 3 and 4, can be placed or adjusted so that the point or line of contact 10 is greatly elongated, and consequently greatly increasing the area of contact and the adhesion.

In pulleys in engagement to transmit power frictionally, as referred to in the preceding paragraph, the line of contact 10 is curved, said line of contact conforming to the peripheral outline of the pulley of the usual kind, and said line of contact will be substantially the length of an equal arc of the periphery of said pulley of the usual kind, whereby there can be no wrinkling of the periphery of the pulley embodying my invention.

By a pulley of the "usual" kind I mean a pulley not having a fluid-tight flexible envelop or tube 3 forming the periphery of said pulley, and therefore a pulley not containing fluid.

The fluid-retention member of the pulley, as hereinbefore described, can be constructed of any suitable flexible material—say, for instance, leather, india-rubber, cotton fabric, or compounds of india-rubber and a proper textile fabric.

The pulley can consist of a plural number of envelops or tubes 3, as shown in Figs. 2 and 4, and said envelops or tubes 3 can be separate or embraced in a single or common web.

The fluid-retention member of the pulley can be single simple envelops or tubes or can be compound—that is to say, consisting of a plurality of envelops or tubes, one within another, the inner one fluid-tight, made of, say, india-rubber and slightly larger than the outer or enveloping member, and the latter, although flexible, can be non-elastic, whereby the inner member will not be subjected when fluid is injected thereinto to a strain that would cause rupture of or leakage from said inner member.

The force of the fluid under pressure within the pulley, acting to cause said pulley to assume a rotund shape, will, where said pulley is flattened, be capable of exerting a force which will cause said pulley to apply a high degree of adhesive force throughout the area of contact.

The fluid can be injected into the pulley by any suitable kind of pump. Said pump can be detachably connected or permanently attached to said pulley. The operation of said pump can be manual or mechanical, automatically or otherwise, continuously or intermittently, to compensate for leakage that may occur or to effect a change of pressure of the fluid in the pulley, and said pump can be operated while said belt or pulley is in motion. A reservoir containing fluid under pressure can be used in conjunction with said pump above mentioned.

The pressure of the fluid in the pulley can correspond to and be governed by the load on said pulley.

The matter described herein, embodying a pulley having a flexible tubular rim containing fluid under pressure engaging a pulley not having a flexible tubular rim containing fluid under pressure, is claimed in my application of even date herewith, Serial No. 636,529, the same being a division of the within application.

Having described my invention, what I claim, and desire to secure by Letters Patent, is—

1. In a power-transmitter, a pulley having a flexible tubular rim containing fluid under pressure, substantially as herein set forth.

2. In a power-transmitter, a pulley having a flexible tubular rim containing fluid under pressure, in combination with a pulley, said pulleys in engagement to transmit power frictionally, substantially as herein set forth.

3. In a power-transmitter, a pulley having a flexible tubular rim containing fluid under pressure, in combination with a pulley having a flexible tubular rim containing fluid under pressure, said pulleys in engagement to transmit power frictionally, substantially as herein set forth.

4. In a power-transmitter, a pulley having a flexible tubular rim containing fluid under pressure, in combination with a pulley, said pulleys in engagement to transmit power frictionally, and said pulleys adjusted so as to increase the area of contact, substantially as herein set forth.

ABRAHAM L. RICH.

Witnesses:
ALBERT STEWART,
JOHN W. SHERRER.